(12) United States Patent
    Cai

(10) Patent No.: US 11,892,646 B2
(45) Date of Patent:      Feb. 6, 2024

(54) HEAD MOUNT DISPLAY SUPPORT AND HEAD MOUNT DISPLAY

(71) Applicant: GUANGDONG OPPO MOBILE TELECOMMUNICATIONS CORP., LTD., Guangdong (CN)

(72) Inventor: Hongzhen Cai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 220 days.

(21) Appl. No.: 17/563,737

(22) Filed: Dec. 28, 2021

(65) Prior Publication Data

US 2022/0121033 A1     Apr. 21, 2022

Related U.S. Application Data

(63) Continuation of application No. PCT/CN2020/104962, filed on Jul. 27, 2020.

(30) Foreign Application Priority Data

Aug. 12, 2019   (CN) .......................... 201910741693.2

(51) Int. Cl.
    *G02B 27/00*  (2006.01)
    *G02B 27/01*  (2006.01)
(52) U.S. Cl.
    CPC ................................ *G02B 27/0176* (2013.01)
(58) Field of Classification Search
    CPC ........ G02B 27/0176; G02B 2027/0154; G02B 2027/0161

(Continued)

(56) References Cited

U.S. PATENT DOCUMENTS

| 2017/0123451 | A1 | 5/2017 | Baudou et al. |
| 2018/0364490 | A1* | 12/2018 | Lin ................. G02B 27/0176 |
| 2019/0037715 | A1* | 1/2019 | Chen .................... G02B 7/002 |

FOREIGN PATENT DOCUMENTS

| CN | 105661735 A | 6/2016 |
| CN | 105792052 A | 7/2016 |

(Continued)

OTHER PUBLICATIONS

Extended European Search Report for EP Application 20852905.7 dated Jul. 8, 2022. (5 pages).

(Continued)

*Primary Examiner* — Adam J Waggenspack
(74) *Attorney, Agent, or Firm* — Young Basile Hanlon & MacFarlane, P.C.

(57) ABSTRACT

A head mount display support includes a support body including two telescopic arms overlapped with each other, a knob shaft configured to move into an overlapping part of the two telescopic arms when being pressed, an adjustment gear sleeved on the knob shaft to mesh with the two telescopic arms and drive the two telescopic arms to move towards or away from each other, a rear housing arranged on a side of the overlapping part away from the knob shaft, an elastic member with an end fixed to the rear housing and a locking member; another end of the elastic member is connected with the locking member; when the knob shaft retracting, the knob shaft drives the adjustment gear to move away from the overlapping part, the elastic member drives the locking member to bounce into the overlapping part to lock a relative position of the two telescopic arms.

20 Claims, 5 Drawing Sheets

(58) Field of Classification Search
USPC .......................................................... 224/181
See application file for complete search history.

(56) References Cited

FOREIGN PATENT DOCUMENTS

| | | | |
|---|---|---|---|
| CN | 205450450 U | 8/2016 | |
| CN | 205594578 U | 9/2016 | |
| CN | 106405861 A | 2/2017 | |
| CN | 106707509 A | 5/2017 | |
| CN | 206282181 U | 6/2017 | |
| CN | 107290849 A | 10/2017 | |
| CN | 107290850 A | 10/2017 | |
| CN | 206960774 U | 2/2018 | |
| CN | 207514543 U | 6/2018 | |
| CN | 207833119 U | 9/2018 | |
| CN | 107076995 B | 2/2019 | |
| CN | 109298527 A | 2/2019 | |
| CN | 209148965 U | 7/2019 | |
| CN | 110441910 A | 11/2019 | |

OTHER PUBLICATIONS

International Search Report with English Translation for PCT Application PCT/CN2020/104962 dated Oct. 26, 2020. (13 pages).
Chinese First Office Action with English Translation for CN Application 201910741693.2 dated Jan. 6, 2021. (14 pages).
Chinese Second Office Action with English Translation for CN Application 201910741693.2 dated Jun. 17, 2021. (16 pages).

* cited by examiner

HEAD MOUNT DISPLAY SUPPORT AND HEAD MOUNT DISPLAY

CROSS-REFERENCE TO RELATED APPLICATION(S)

The present application is a continuation-application of International (PCT) Patent Application No. PCT/CN2020/104962 filed Jul. 27, 2020, which claims foreign priority of Chinese Patent Application No. 201910741693.2, filed on Aug. 12, 2019, the entire contents of both of which are hereby incorporated by reference.

TECHNICAL FIELD

The described embodiments relate to head mount display, and in particular to a head mount display support and a head mount display.

BACKGROUND

A head mount display is a kind of a head-mounted virtual display, also known as a glasses-type display or a portable theater. Because the appearance of the glasses-type display is similar to that of glasses, and it is designed to display video images of audio and video players on a large screen, it is vividly called video glasses.

Since the head shape, face shape, and fatness of wearers are different, in order to meet requirements of different wearers, a head mount display support of the head mount display is generally adjustable in the circumferential direction. However, after the adjustment is completed, the shape of the head mount display support needs to be fixed. Most the head mount display supports are equipped with locking structures, the locking structures have a complex structure and results in an inconvenient operation. Most of the wearers put the head mount display on their head, and then adjust the head mount display support, which is inconvenient to operate.

SUMMARY

According to an aspect of the present disclosure, a head mount display support may be provided. The head mount display support includes a support body including two telescopic arms, wherein the two telescopic arms are overlapped with each other; a knob shaft configured to move into an overlapping part of the two telescopic arms in response to being pressed; an adjustment gear fixedly sleeved on the knob shaft, and configured to, in response to the knob shaft being pressed, be driven by the knob shaft to move to the overlapping part and mesh with the two telescopic arms, and drive the two telescopic arms to move towards or away from each other; and a self-locking mechanism including a rear housing, an elastic member and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state; wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms.

According to another aspect of the present disclosure, a head mount display may be provided. The head mount display includes a head mount display support, including: a support body including two telescopic arms, wherein the two telescopic arms are overlapped with each other; a knob shaft configured to move into an overlapping part of the two telescopic arms in response to being pressed; an adjustment gear fixedly sleeved on the knob shaft, and configured to, in response to the knob shaft being pressed, be driven by the knob shaft to move to the overlapping part and mesh with the two telescopic arms, to drive the two telescopic arms to move towards or away from each other; and a self-locking mechanism including a rear housing, an elastic member, and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state; wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms; and a display module, arranged on the support body.

According to another aspect of the present disclosure, a head mount display support may be provided. The head mount display support includes a front housing, a rear housing connected to the front housing and defining a accommodating cavity with the front housing; two telescopic arms, wherein an end portion of each of the two elescopic arms are overlapped with each other to form an overlapping part, the overpapping part is received in the accommodating cavity; a knob shaft, penetrating the front housing from a side of the front housing away from the accommodating cavity to the accommodating cavity, wherein the knob shaft is capable of rotating; an adjustment gear sleeved on a part of the knob shaft in the accommodating cavity, and configured to rotate with the rotating of the knob shaft; an elastic member arranged in the accommodating cavity, wherein an end of the elastic member is connected on the rear housing; and a locking member arranged in the accommodating cavity and connected to another end of the elastic member; wherein, in response to the knob shaft moving towards the overlapping part, the adjustment gear is configured to be driven by the knob shaft to move to the overlapping part and mesh with the two telescopic arms, to drive the two telescopic arms to move towards or away from each other; in response to the knob shaft moving away from the overlapping part, the adjustment gear is driven by the knob shaft to move away from the overlapping part, and the elastic member is configured to drive the locking member to bounce into the overlapping part to lock a relative position of the two telescopic arms.

DETAILED DESCRIPTION

Figure 1:
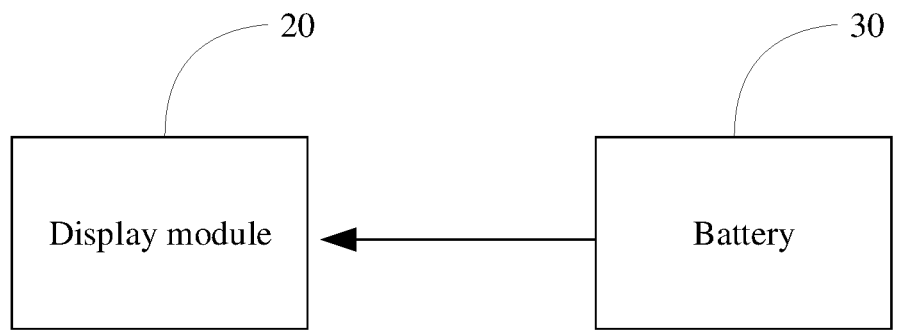
FIG. 1 is a block view of a part of a circuit of a head mount display support according to an embodiment of the present disclosure.

Although the present disclosure can be easily expressed in different forms of embodiments, only some of the specific embodiments are illustrated in the drawings and described in detail in this specification. At the same time, it would be appreciated that this specification should be regarded as an exemplary description of the principles of the disclosure and cannot be construed as a limitation to the present disclosure.

Therefore, a feature indicated in the specification will be used to describe one of the features of an embodiment of the present disclosure, instead of implying that each embodiment of the present disclosure must have the described feature. In addition, it should be noted that the specification describes many features. Although certain features can be combined to illustrate possible system designs, these features may also be used in other unspecified combinations. Thus, unless otherwise stated, the illustrated combinations could not to be appreciated as limiting the present disclosure.

In the embodiments shown in the drawings, direction indications (such as up, down, left, right, front and back) are used to explain that the structure and movement of various elements of the present disclosure is not absolute but relative. These descriptions are appropriate when these elements are located in positions shown in the drawings. If the description of the position of the elements changes, the directions of the directions are also changed accordingly.

Embodiments will be described more fully with reference to the accompanying drawings. However, the embodiments can be implemented in various forms, and should not be construed as being limited to the examples set forth herein; on the contrary, the embodiments are provided so that the description of the present disclosure will be more comprehensive and complete, and the concept of the embodiments comprehensively communicates to those skilled in the art. The drawings are only schematic illustrations of the present disclosure, and are not necessarily drawn to scale. The same reference numerals in the figures denote the same or similar parts, and thus their repeated description will be omitted.

According to an aspect of the present disclosure, a head mount display support may be provided. The head mount display support includes a support body including two telescopic arms, wherein the two telescopic arms are overlapped with each other; a knob shaft configured to move into an overlapping part of the two telescopic arms in response to being pressed; an adjustment gear fixedly sleeved on the knob shaft, and configured to, in response to the knob shaft being pressed, be driven by the knob shaft to move to the overlapping part and mesh with the two telescopic arms, and drive the two telescopic arms to move towards or away from each other; and a self-locking mechanism including a rear housing, an elastic member and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state; wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms.

In one embodiment, in response to the knob shaft being pressed, the knob shaft protrudes to the overlapping part to drive the locking member move away from the overlapping part, and the adjustment gear is configured to move to the overlapping part with protruding of the knob shaft.

In one embodiment, each of the two telescopic arms defines a guiding groove; the adjustment gear is received in the guiding grooves in response to the adjustment gear moving to the overlapping part, and the adjustment gear meshes with an inner wall of each guiding grooves; and the two telescopic arms move towards or away from each other in response to the adjustment gear rotating along the guiding grooves.

In one embodiment, the inner wall of each guiding groove is provided with teeth, and a shape of each guiding groove is rectangular.

In one embodiment, a side of an inner wall of the guiding groove of one of the two telescopic arms is provided with teeth, a side of an inner wall of the guiding groove of the other one of the two telescopic arms is provided with teeth, and the teeth of two guiding grooves are arranged opposite to each other.

In one embodiment, the self-locking mechanism further includes a directional column, an end of the directional column is fixed to the rear housing; the elastic member is a spring, the locking member is a locking gear, and the elastic member and the locking member are sequentially sleeved on the directional column; the locking member is configured to slide along a length direction of the directional column, and the directional column is configured to limit rotation of the locking member in a circumferential direction of the locking member, and the locking member locks the relative position of the two telescopic arms.

In one embodiment, the directional column is a prism, the locking member defines an assembly hole, and the assembly hole is matched with a cross-sectional shape of the directional column to limit the rotation of the locking member.

In one embodiment, the overlapping part is curved along a length direction of the overlapping part; the locking member is curved along the length direction of the overlapping part; a radian of the locking member matches with a radian of the overlapping part.

In one embodiment, the self-lock-ing mechanism further includes a limit piece, and the limit piece is fixed to another end of the directional column and engaged with the locking member to limit positions of the locking member and the directional column.

In one embodiment, a containing groove is defined by the rear housing, the locking member is received in the containing groove; and the directional column is fixed on a bottom of the containing groove.

In one embodiment, the end of the knob shaft defines an avoidance groove, and the avoidance groove is arranged to provide a space to receive the directional column, and extends in a length direction of the knob shaft; in response to the knob shaft being pressed, the end of the knob shaft is configured to push the locking member towards the direction of the rear housing and the another end of the directional column is received in the avoidance groove.

In one embodiment, the adjustment gear is sleeved on the knob shaft to fixedly connect to the knob shaft by interference fit.

In one embodiment, another end of the knob shaft is fixedly connected with a knob cover; a distance between the adjustment gear and the overlapping part is controlled by pressing the knob cover; and a rotation of the adjustment gear is controlled by rotating the knob cover.

In one embodiment, the head mount display support further includes a front housing, wherein the front housing is arranged on another side of the overlapping part and opposite to the rear housing; the knob shaft penetrates the front housing, a gap is defined between the knob cover and the front housing, the knob cover moves to contact the surface of the front housing in response to the knob being pressed, and the moving distance of the adjustment gear driven by the knob shaft makes the adjustment gear move to the overlapping part.

In one embodiment, the locking member has a square shape, and a top and a bottom of the locking member are provided with teeth to mesh with the teeth in the guiding grooves in response to the locking member being received in the guiding grooves.

In one embodiment, the front housing and the rear housing define an accommodating cavity, and a battery of a head mount display is accommodated in the accommodating cavity.

According to another aspect of the present disclosure, a head mount display may be provided. The head mount display includes a head mount display support, including: a support body including two telescopic arms, wherein the two telescopic arms are overlapped with each other; a knob shaft configured to move into an overlapping part of the two telescopic arms in response to being pressed; an adjustment gear fixedly sleeved on the knob shaft, and configured to, in response to the knob shaft being pressed, be driven by the knob shaft to move to the overlapping part and mesh with the two telescopic arms, to drive the two telescopic arms to move towards or away from each other; and a self-locking mechanism including a rear housing, an elastic member, and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state; wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms; and a display module, arranged on the support body.

According to another aspect of the present disclosure, a head mount display support may be provided. The head mount display support includes a front housing, a rear housing connected to the front housing and defining a accommodating cavity with the front housing; two telescopic arms, wherein an end portion of each of the two elescopic arms are overlapped with each other to form an overlapping part, the overpapping part is received in the accommodating cavity; a knob shaft, penetrating the front housing from a side of the front housing away from the accommodating cavity to the accommodating cavity, wherein the knob shaft is capable of rotating; an adjustment gear sleeved on a part of the knob shaft in the accommodating cavity, and configured to rotate with the rotating of the knob shaft; an elastic member arranged in the accommodating cavity, wherein an end of the elastic member is connected on the rear housing; and a locking member arranged in the accommodating cavity and connected to another end of the elastic member; wherein, in response to the knob shaft moving towards the overlapping part, the adjustment gear is configured to be driven by the knob shaft to move to the overlapping part and mesh with the two telescopic arms, to drive the two telescopic arms to move towards or away from each other; in response to the knob shaft moving away from the overlapping part, the adjustment gear is driven by the knob shaft to move away from the overlapping part, and the elastic member is configured to drive the locking member to bounce into the overlapping part to lock a relative position of the two telescopic arms.

In one embodiment, each of the two telescopic arms defines a guiding groove in the overlapping part; the adjustment gear is received in the guiding grooves in response to the adjustment gear moving to the overlapping part, and the adjustment gear meshes with an inner wall of each guiding grooves; and the two telescopic arms move towards or away from each other in response to the adjustment gear rotating along the guiding grooves.

In one embodiment, the two telescopic arms are relatively interleaving arranged, a side of the one of the two telescopic arms facing the other one of the two telescopic arms, and a side of the other one of the two telescopic arms facing the side of the one of the two telescopic arms, are configured to mesh with the adjustment gear.

Referring to FIG. 1, a head mount display of the embodiments of the present disclosure includes a head mount display support and an imaging module. The head mount display of the embodiments of the present disclosure includes the head mount display support, a display module 20 and a battery 30. The display module 20 is arranged on an end of the head mount display support, and the battery 30 is arranged on the other end of the head mount display support. For convenience to describe, in an example of the present disclosure, the display module 20 is arranged on a front end of the head mount display support, and the battery 30 is arranged on a rear end of the head mount display support.

The display module 20 may be configured to display a scene content experienced by users in real time, in other words, display images and scenes experienced by AR glasses wearers. A number of the display module 20 may be one or more, the number can be designed according to different needs, and the number is not limited in the present disclosure.

In some embodiments, the battery 30 may be arranged on the rear end of the head mount display support, which is opposite to the display module 20. The battery 30 and the display module 20 are respectively arranged on two ends of the head mount display, so that it is possible to keep weight of the head mount display be relatively balanced. In this way, when the head mount display of the present disclosure is worn and used, the weight can be evenly distributed around user's head, such that it is possible to avoid concentrated pressure on user's forehead and nose, make it comfortable to wear, and improve the user's experience.

The imaging module is arranged on a lens frame. The head mount display may be applied to multiple fields, for example, games, movies, education, military, medical, enterprise, e-commerce and other fields, which is not limited herein. In addition, the head mount display may be 3D glasses, virtual reality (VR) glasses, augmented reality (AR) glasses, etc.

Specifically, taking the head mount display being an AR glasses as an example in this embodiment, and other embodiments will not be described in detail.

The AR glasses may make a scene that wearers see as a combination of virtual images and real life. It is possible to make the AR glasses realize many functions and be regarded as a miniature mobile phone, which may realize judging the current state of users through the trajectory of the eyeball, and enable the corresponding function.

The imaging module may be configured to generate an image from an image of the AR glasses. A number of the imaging module may be one or more, the number can be designed according to different needs, and the number is not limited herein.

Figure 2:
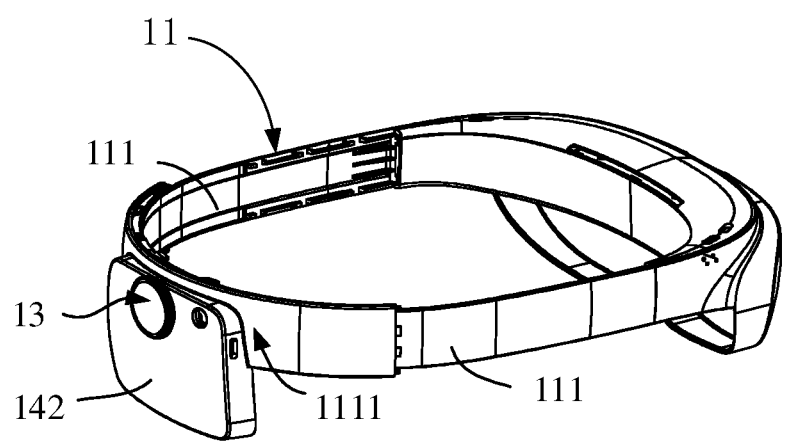
FIG. 2 is a structural view of the head mount display support according to an embodiment of the present disclosure.

Referring to FIG. 2, the head mount display support according to some embodiments of the present disclosure includes a support body 11, a knob shaft 131, an adjustment gear 12 and a self-locking mechanism.

The support body 11 may be configured to hoop user's head, so as to bear the main weight of the AR glasses. A shape of the support body 11 may be a ring or a headband, which is adapted to a shape of user's head and meets the requirements of ergonomic design. The support body 11 may disperse the gravity of AR glasses to improve the stability of wearing the AR glasses as much as possible.

The support body 11 includes a lens frame and two telescopic arms 111 arranged on two sides of the lens frame. The two telescopic arms 111 overlap each other so as to keep the support body 11 in a closed ring. Length of the two telescopic arms 111 is the same, and an overlapping part 1111 of the two telescopic arms 111 is arranged on a rear end of the support body 11, which is corresponding to a position of a back of wearer's head. It would be appreciated that the overlapping part 1111 may also be on other positions of the support body 11 by adjusting the length of the two telescopic arms 111, for example, the overlapping part 1111 may be corresponding to a position of the back of wearer's ears, or both sides of wearer's forehead, etc.

Each free end of the two telescopic arms 111 may be provided with a lap joint. Two lap joints of the two telescopic arms 111 overlap and joint to each other so as to keep the support body 11 in a closed ring. The two telescopic arms 111 may move towards or away from each other so as to adjust an overlapping length of the two lap joints, and to adjust a circumference of the support body 11, such that the support body 11 could be suitable for wearers having different sizes of head shapes to wear. It would be appreciated that the lap joint may be arranged on an end of each telescopic arm 111, or on other positions such as the middle portion of the two telescopic arms 111, which is not limited herein.

Figure 3:
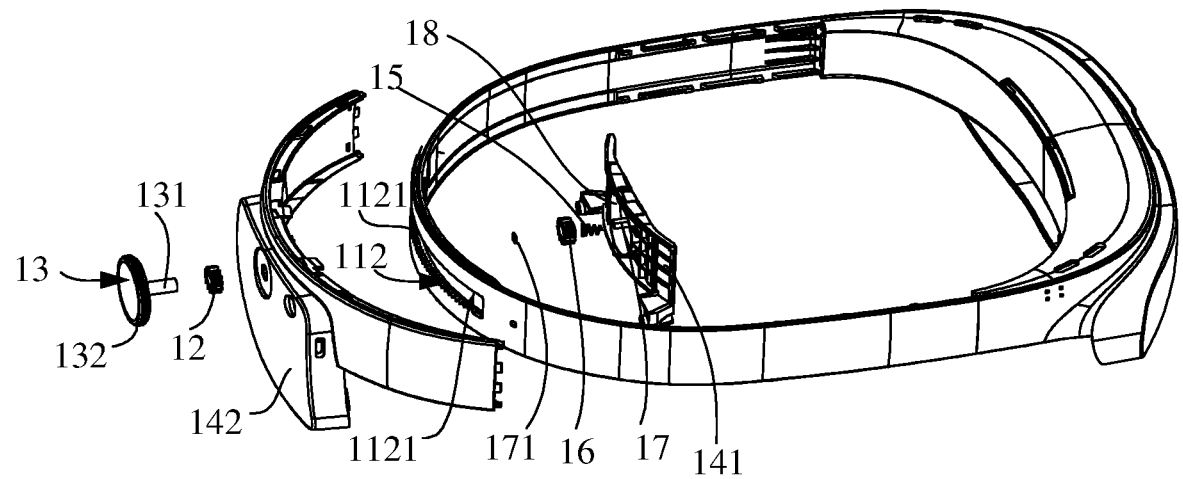
FIG. 3 is an exploded view of the head mount display support in FIG. 2.

Referring to FIG. 3, in some embodiments, a guiding groove 112 may be defined in each of the lap joints, such that the two telescopic arms 111 are driven to telescopically move relative to each other along the guiding grooves 112. In addition, an inner wall of the guiding groove 112 in each of the lap joints may be provided with teeth 1121. The guiding grooves 112 may be long and narrow slots, or rectangular slots. The teeth 1121 may be arranged on the inner wall of the guiding grooves 112 extending in a length direction, so as to make the inner wall be formed to be a structure similar to a rack. Specifically, a side of the inner wall of one of the two telescopic arms 111 may be provide with teeth 1121. A side of the inner wall of the other one of the two telescopic arms 111, which is opposite to the side of the inner wall of one of the two telescopic arms 111, may be provided with teeth 1121. The teeth 1121 in two guiding grooves 112 of the two telescopic arms 111 may be arranged opposite to each other, which may be respectively arranged on two opposite sides of the two guiding grooves 112.

In some embodiments, the support body 11 may further include the knob shaft 131 and the adjustment gear 12, such that it is possible to adjust a relative position the two telescopic arms 111, and to adjust the size of the head mount display support to more suitable for user's head. An end of the knob shaft 131 may be arranged on a side of the overlapping part 1111, and another end of the knob shaft 131 may extend approximately to the overlapping part 1111. The adjustment gear 12 may be fixedly sleeved on the knob shaft 131, and the adjustment gear 12 may be fixedly connected with the knob shaft 131 by interference fit, thus the adjustment gear 12 may rotate with the rotating of the knob shaft 131.

The support body 11 may further include a front housing 142 configured to support and fix the knob shaft 131 and the adjustment gear 12, and connected to the overlapping part 1111. Specifically, the front housing 142 is arranged on a side of the overlapping part 1111 close to the knob shaft 131. In some embodiments, taking the head mount display support being worn on wearer's head as an example, the overlapping part 1111 may be arranged on the back of wearer's head, and the front housing 142 may be arranged on a side of the overlapping part 1111 of the two telescopic arms 111 away from the back of wearer's head.

In some embodiments, the front housing 142 may have a substantially arc shape towards the display module 20 in a vertical direction. A top of the front housing 142 may be substantially flush with a top edge of the telescopic arm 111, and a bottom of the front housing 142 may extend downward to protrude relative to a bottom edge of the telescopic arm 111. As a result, the bottom of the front housing 142 could approach or be close to wearer's rear shoulder when wearer wears the head mount display, so that it is possible to reduce the pressure of the head mount display on the wearer's head, when the wearer is tired of wearing the head mount display for a long time, by the front housing 142 being supported by the wearer's rear shoulder.

A knob cover 132 may be fixedly connected to the end of the knob shaft 131, and structure of the knob cover 132 and the knob shaft 131 may be integral or independent. The knob shaft 131 and the knob cover 132 may form a knob 13. The knob shaft 131 may penetrate the front housing 142 from a surface of the front housing 142 and extend toward the overlapping part 1111 when the knob 13 is assembled to the front housing 142. In addition, anti-slip patterns may be arranged on an outer peripheral of the knob cover 132 so as to facilitate rotating of the knob cover 132 by hand. Therefore, it is possible that the wearer could control a distance between the adjustment gear 12 and the overlapping part 1111 by pressing the knob cover 132, and control the rotation of the adjustment gear 12 by rotating the knob cover 132.

Figure 4:
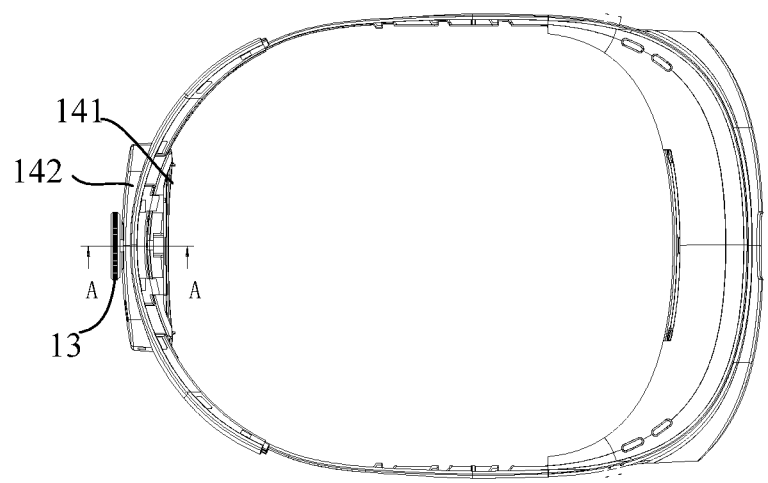
FIG. 4 is a top view of the head mount display support in FIG. 2.
Figure 5:
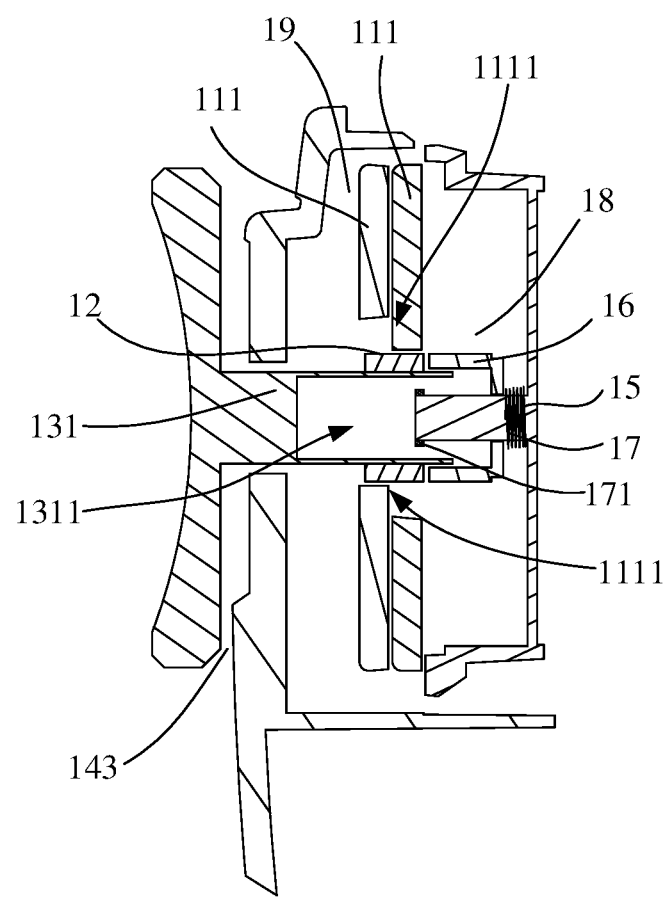
FIG. 5 is a sectional view along A-A of the head mount display support in FIG. 4 in an adjusted state.

Referring to FIG. 4 and FIG. 5, when the wearer adjusts the size of the head mount display support, the knob shaft 131 may be configured to drive the adjustment gear 12 to move towards the overlapping part 1111 by pressing the knob cover 132, such that the knob shaft 131 drives the adjustment gear 12 to move to the overlapping part 1111. When the adjustment gear 12 is simultaneously received in the guiding grooves 112 of the two telescopic arms 111, teeth of the adjustment gear 12 mesh with the teeth 1121 in the two guiding grooves 112. When the knob shaft 131 drives the adjustment gear 12 to rotate, the adjustment gear 12 may rotate along the guiding grooves 112, such that the two telescopic arms 111 moves towards or away from each other, to change a length of the overlapping part 1111, thereby adjusting the head mount display support.

Figure 8:
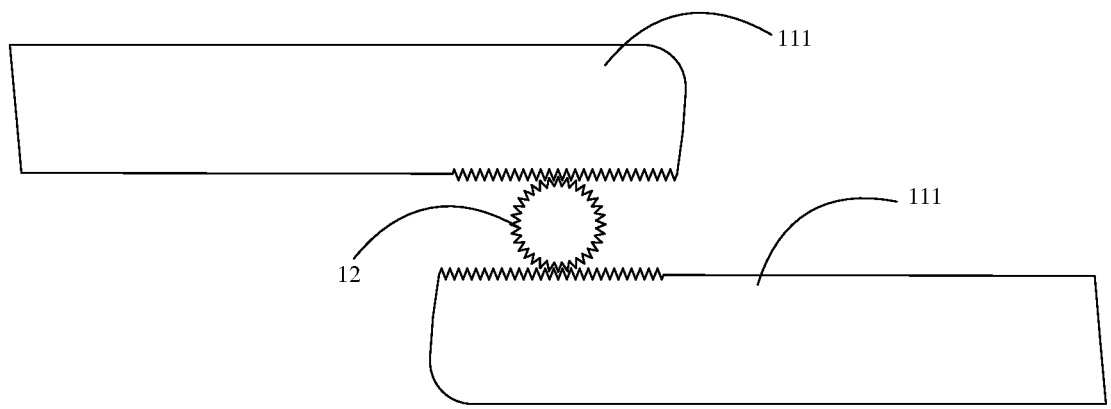
FIG. 8 is a structural view of two telescopic arms according to some embodiments of the present disclosure.

Referring to FIG. 8, in some embodiments, it would be understood that the guiding grooves 112 may be omitted in other embodiments. The two telescopic arms 111 may be relatively interleaving arranged, and each of the two telescopic arms 111 is provided with two sides. A side of the one of the two telescopic arms 111 facing the other one of the two telescopic arms 111, and a side of the other one of the two telescopic arms 111 facing the side of the one of the two telescopic arms 111, may mesh with the adjustment gear 12. Therefore, as long as the two telescopic arms 111 mesh with the adjustment gear 12 at the same time, it is possible to drive the adjustment gear 12 to rotate, when the two telescopic arms 111 move relative to each other.

In order to facilitate the wearer to control a distance of pressing the knob 13, when the knob 13 is pressed, the adjustment gear 12 just moves into the guiding grooves 112 of the two telescopic arms 111, In this embodiment, a gap 143 may be defined between the knob cover 132 and the surface of the front housing 142 before pressing the knob 13. When the knob 13 is pressed, the knob cover 132 may move to a position where the knob cover 132 is in contact with the surface of the front housing 142, a moving distance of the adjustment gear 12 driven by the knob shaft 131 makes the adjustment gear 12 move to the overlapping part 1111 to mesh with the teeth 1121 in the guiding grooves 112. Therefore, the present embodiment improves the convenience of adjusting the size of the headset support. The wearer does not need to accurately control the moving distance of the knob 13. Through simple operation, the adjustment gear 12 can be moved to the right position to achieve the purpose of adjusting the headset support.

The self-locking mechanism may be arranged on a side of the overlapping part 1111. The two telescopic arms 111 may be configured to move towards or away from each other, and when the two telescopic arms 111 relatively stretch to a proper position, the self-locking mechanism may be configured to locate a relative position of the two telescopic arms 111, so as to keep the position of the two telescopic arms 111, thereby ensuring normal use of the head mount display.

Referring to FIG. 3, the self-locking mechanism may include a rear housing 141, an elastic member 15 and a locking member 16. The rear housing 141 may be arranged on another side of the overlapping part 1111 away from the knob shaft 131. An end of the elastic member 15 may be fixed on the rear housing 141, and the other end of the elastic member 15 may be connected with the locking member 16. The locking member 16 may abut against the end of the knob shaft 131, when the knob shaft 131 is pressed.

The rear housing 141 may be fixedly connected to the overlapping part 1111 or a part next to the overlapping part 1111. The rear housing 141 and the front housing 142 may be respectively arranged on opposite sides of the two telescopic arms 111, in other words, the rear housing 141 is arranged on a first side of the overlapping part 1111, and the front housing 142 is arranged on a second side of the overlapping part 1111 opposite to the first side. When the head mount display is worn, the rear housing 141 may be close to the back of wearer's head. A surface of the rear housing 141 that contacts the back of wearer's head is curved so as to fit the shape of the back of wearer's head as much as possible, thereby improving the wearing comfort. The front housing 142 and the rear housing 141 may define an accommodating cavity 19, and the battery 30 of the head mount display may be accommodated in the accommodating cavity 19. The batteries 30 may be centrally arranged on a position of the accommodating cavity 19, or arranged dispersedly, so as to match positions of the adjustment gear 12, the knob shaft 131, the locking member 16, and the like in the accommodating cavity 19, thereby reducing volume of the accommodating cavity 19. A containing groove 18 may be defined by the rear housing 141, and the containing groove 18 may be configured to contain the locking member 16.

An end of the elastic member 15 may be fixed on the rear housing 141, and the other end of the elastic member 15 may be connected with the locking member 16. The elastic member 15 may be a spring, of course, and the elastic member 15 may be an elastic piece. A part of the locking member 16 may be arranged between the elastic member 15 and the knob shaft 131. In this way, it is possible to adjust a position of the locking member 16 via the cooperation of the elastic member 15 with the knob shaft 131. The locking member 16 may be configured to lock a relative position of the two telescopic arms 111, when the locking member 16 is located at the overlapping part 1111.

It would be appreciated that a structural member capable of locking the relative positions of the two telescopic arms 111 may be used as the locking member 16. In this embodiment, the locking member 16 may be a circular gear so as to mesh with the teeth 1121 in the guiding grooves 112 of the two telescopic arms 111 at the same time. The self-locking mechanism may further include a directional column 17, and an end of the directional column 17 may be fixed on the rear housing 141. More specifically, the directional column 17 may be fixed on a bottom of the containing groove 18. The elastic member 15 may a spring, the locking member 16 may be a locking gear, and the elastic member 15 and the locking member 16 may be sleeved on the directional column 17 in sequence. The locking member 16 may be configured to slide along a length direction of the directional column 17. The directional column 17 may be configured to limit a rotation of the locking member 16 in a circumferential direction of the locking member 16, such that the locking member 16 could lock the relative position of the two telescopic arms 111.

Figure 7:
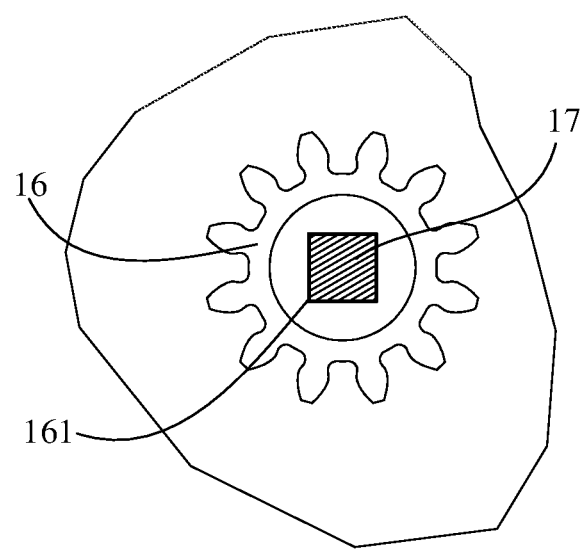
FIG. 7 is a schematic view of a directional column and a locking member in FIG. 2 in an assembled state.

Referring to FIG. 7, the directional column 17 may be a prism, the locking member 16 may define an assembly hole 161. The assembly hole 161 may be adapted to a cross-sectional shape of the directional column 17, such that the directional column 17 could limit the rotation of the locking member 16 in a circumferential direction of the locking member 16. For example, the directional column 17 may be a quadrangular prism, the assembly hole 161 may have a shape corresponding to the cross-sectional shape of the quadrangular prism, so that the locking member 16 arranged in the quadrangular prism cannot rotate relative to the directional column 17, but can move along the length direction of the directional column 17.

Figure 6:
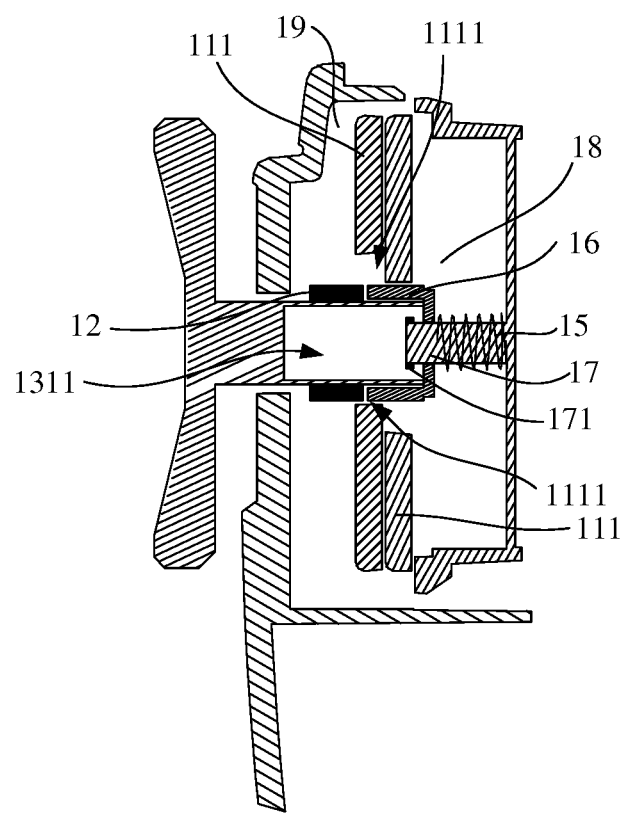
FIG. 6 is a sectional view along A-A of the head mount display support in FIG. 4 in a self-locking.

Referring to FIG. 4 and FIG. 6, when the knob shaft 131 is pressed, the end of the knob shaft 131 may abut against the locking member 16, and the locking member 16 moves along the directional column 17 towards the rear housing 141. In order to avoid the directional column 17 continuously protruding out the locking member 16 when the locking member 16 is moving, an avoidance groove 1311 may be defined on the end of the knob shaft 131. The avoidance groove 1311 may be configured to provide a space for receiving the directional column 17. The avoidance groove 1311 may extend in a length direction of the knob shaft 131. When the knob shaft 131 is pressed, the end of the knob shaft 131 may push the locking member 16 to move towards the rear housing 141, and another end of the directional column 17 may be received in the avoidance groove 1311.

The self-locking mechanism may further include a limit piece 171, and the limit piece 171 may be fixed on the another end of the directional column 17 and engaged with the locking member 16 to limit position. More specifically, the limit piece 171 may be a gasket so as to block the another end of the directional column 17, thereby preventing the locking member 16 from being separated from the directional column 17 under an elastic force of the elastic member 15.

Figure 9:
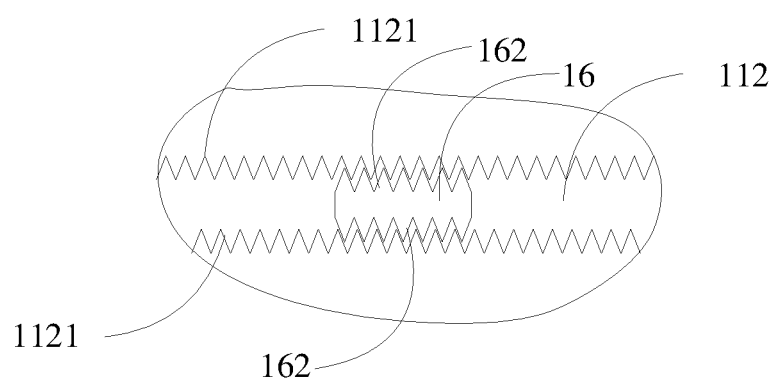
FIG. 9 is a structural view of a locking member according to some embodiments of the present disclosure.

Referring to FIG. 9, in other embodiments, the locking member 16 may have a square shape, and a top and a bottom of the locking member 16 may be provided with teeth 162. When the locking member 16 is received in the guiding grooves 112, the teeth 162 arranged on the top and the bottom of the locking member 16 may respectively mesh with the teeth 1121 in the guiding grooves 112 of the two telescopic arms 111. The locking member 16 cannot rotate in the guiding grooves 112 because of the shape thereof, locking the relative position of the two telescopic arms 111 could be realized.

Furthermore, the overlapping part 1111 is curved along a length direction of the overlapping part 1111. The locking member 16 is curved along the length direction of the overlapping part 1111. A radian of the locking member 16 matches with a radian of the overlapping part 1111. In other words, a length direction of the locking member 16 may extend in a length direction of the guiding grooves 112, and may have a certain radian to match a radian of the guiding grooves 112.

As shown in FIG. 4 and FIG. 5, specifically, when the knob shaft 131 is pressed, the adjustment gear 12 may be located in the guiding grooves 112, and the head mount display may be in an adjustable state at this time. Meanwhile, the locking member 16 may abut against the end of the knob shaft 131, and the elastic member 15 may be in a compressed state. When a force of pressing the knob 13 disappears to make the knob shaft 131 retract, the knob shaft 131 drives the adjustment gear 12 to move away from the guiding grooves 112 of the overlapping part 1111. Meanwhile, the elastic member 15 may drive the locking member 16 to bounce into the guiding grooves 112 of the overlapping part 1111 and mesh with the teeth in the guiding grooves 112 due to the retraction of the knob shaft 131, so as to lock the relative position of the two telescopic arms 111, and the head mount display support may be in a self-locking state at the same time.

Moreover, when the knob shaft 131 is pressed again, the knob shaft 131 may protrude towards the guiding grooves 112 of the overlapping part 1111, and the end of the knob shaft 131 may abut against the locking member 16 located in the guiding grooves 112 of the overlapping part 1111. Therefore, the locking member 16 is driven to separate from the guiding grooves 112 of the overlapping part 1111. In addition, the adjustment gear 12 may move to the guiding grooves 112 of the overlapping part 1111 with protruding of the knob shaft 131 to mesh with the teeth 1121 in the guiding grooves 112, so that it is possible to make the head mount display support return from the self-locking state to an adjustment state.

The head mount display support described above may realize the adjustment of the shape and size of the head mount display support by arranging the two telescopic arms 111 capable of stretching relatively. Wearers could adjust according to their own head shapes, so that the head mount display support could be suitable for a variety of head shapes.

When the two telescopic arms 111 of the head mount display support described above are adjusted to a proper position, the relative position of the two telescopic arms 111 could be positioned by the self-locking mechanism to keep the two telescopic arms 111 positioned, so as to ensure the normal use of the head mount display.

Furthermore, when the knob shaft 131 is pressed, the adjustment gear 12 may move to the overlapping part 1111 with protruding of the knob shaft 131, so as to keep the head mount display support in the adjustment state; when the force of pressing the knob 13 disappears to make the knob shaft 131 retract, the knob shaft 131 drives the adjustment gear 12 to move away from the overlapping part 1111. In addition, the elastic member 15 may drive the locking member 16 to bounce into the overlapping part 1111 due to the retraction of the knob shaft 131, so as to lock the relative position of the two telescopic arms 111. The head mount display support is in the self-locking state at the same time, so as to ensure the stability of wearing the head mount display support.

Therefore, by arranging the head mount display support, it is possible to make the head mount display described above be convenient to operate and easy to realize during adjusting and self-locking.

Although the present disclosure has been described with reference to some typical embodiments, it should be appreciated that the terms described above are exemplary and illustrative, and cannot be construed to limit the present disclosure. Since the present disclosure can be implemented in various forms without departing from the spirit or essence of the present disclosure, it should be appreciated that the embodiments described above are not limited to any of the foregoing details, but should be interpreted broadly within the spirit and scope defined by appended claims. Therefore, changes and modifications falling within the scope of claims or their equivalents should be covered by the appended claims.

What is claimed is:

1. A head mount display support, comprising:
   a support body comprising two telescopic arms, wherein the two telescopic arms are overlapped with each other;
   a knob shaft configured to move into an overlapping part of the two telescopic arms in response to being pressed;
   an adjustment gear fixedly sleeved on the knob shaft, and configured to, in response to the knob shaft being pressed, be driven by the knob shaft to move to the overlapping part and mesh with the two telescopic arms, and drive the two telescopic arms to move towards or away from each other; and
   a self-locking mechanism comprising a rear housing, an elastic member and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state;
   wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms.

2. The head mount display support of claim 1, wherein in response to the knob shaft being pressed, the knob shaft protrudes to the overlapping part to drive the locking member move away from the overlapping part, and the adjustment gear is configured to move to the overlapping part with protruding of the knob shaft.

3. The head mount display support of claim 1, wherein each of the two telescopic arms defines a guiding groove; the adjustment gear is received in the guiding grooves in response to the adjustment gear moving to the overlapping part, and the adjustment gear meshes with an inner wall of each guiding groove; and the two telescopic arms move towards or away from each other in response to the adjustment gear rotating along the guiding grooves.

4. The head mount display support of claim 3, wherein the inner wall of each guiding groove is provided with teeth, and a shape of each guiding groove is rectangular.

5. The head mount display support of claim 3, wherein a side of an inner wall of the guiding groove of one of the two telescopic arms is provided with teeth, a side of an inner wall of the guiding groove of the other one of the two telescopic arms is provided with teeth, and the teeth of two guiding grooves are arranged opposite to each other.

6. The head mount display support of claim 3, wherein the self-locking mechanism further comprises a directional column, an end of the directional column is fixed to the rear housing; the elastic member is a spring, the locking member is a locking gear, and the elastic member and the locking member are sequentially sleeved on the directional column; and the locking member is configured to slide along a length direction of the directional column, and the directional column is configured to limit rotation of the locking member in a circumferential direction of the locking member, and the locking member locks the relative position of the two telescopic arms.

7. The head mount display support of claim 6, wherein the directional column is a prism, the locking member defines an assembly hole, and the assembly hole is matched with a cross-sectional shape of the directional column to limit the rotation of the locking member.

8. The head mount display support of claim 3, wherein the overlapping part is curved along a length direction of the overlapping part; the locking member is curved along the length direction of the overlapping part; a radian of the locking member matches with a radian of the overlapping part.

9. The head mount display support of claim 6, wherein the self-lock-ing mechanism further comprises a limit piece, and the limit piece is fixed to another end of the directional column and engaged with the locking member to limit positions of the locking member and the directional column.

10. The head mount display support of claim 6, wherein a containing groove is defined by the rear housing, the locking member is received in the containing groove; and the directional column is fixed on a bottom of the containing groove.

11. The head mount display support of claim 6, wherein the end of the knob shaft defines an avoidance groove, and the avoidance groove is arranged to provide a space to receive the directional column, and extends in a length direction of the knob shaft; and in response to the knob shaft being pressed, the end of the knob shaft is configured to push the locking member towards the direction of the rear housing and the another end of the directional column is received in the avoidance groove.

12. The head mount display support of claim 1, wherein the adjustment gear is sleeved on the knob shaft to fixedly connect to the knob shaft by interference fit.

13. The head mount display support of claim 12, wherein another end of the knob shaft is fixedly connected with a knob cover; a distance between the adjustment gear and the overlapping part is controlled by pressing the knob cover; and a rotation of the adjustment gear is controlled by rotating the knob cover.

14. The head mount display support of claim 13, further comprising a front housing, wherein the front housing is arranged on another side of the overlapping part and opposite to the rear housing; and the knob shaft penetrates the front housing, a gap is defined between the knob cover and the front housing, the knob cover moves to contact a surface of the front housing in response to the knob shaft being pressed, and the moving distance of the adjustment gear driven by the knob shaft makes the adjustment gear move to the overlapping part.

15. The head mount display support of claim 4, wherein the locking member has a square shape, and a top and a bottom of the locking member are provided with teeth to mesh with the teeth in the guiding grooves in response to the locking member being received in the guiding grooves.

16. The head mount display support of claim 15, wherein the front housing and the rear housing define an accommodating cavity, and a battery of a head mount display is accommodated in the accommodating cavity.

17. A head mount display, comprising:
a head mount display support, comprising:
a support body comprising two telescopic arms, wherein the two telescopic arms are overlapped with each other;
a knob shaft configured to move into an overlapping part of the two telescopic arms in response to being pressed;
an adjustment gear fixedly sleeved on the knob shaft, and configured to, in response to the knob shaft being pressed, be driven by the knob shaft to move to the overlapping part and mesh with the two telescopic arms, to drive the two telescopic arms to move towards or away from each other; and
a self-locking mechanism comprising a rear housing, an elastic member, and a locking member; wherein the rear housing is arranged on a side of the overlapping part away from the knob shaft, an end of the elastic member is fixed to the rear housing and another end of the elastic member is connected with the locking member, and the locking member is configured to abut against an end of the knob shaft in response to the knob shaft being in a pressed state;
wherein in response to the knob shaft retracting, the knob shaft is configured to drive the adjustment gear to move away from the overlapping part, and the elastic member is configured to drive the locking member to bounce into the overlapping part, to lock a relative position of the two telescopic arms; and
a display module, arranged on the support body.

18. A head mount display support, comprising:
a front housing,
a rear housing connected to the front housing and defining a accommodating cavity with the front housing;

two telescopic arms, wherein an end portion of each of the two telescopic arms are overlapped with each other to form an overlapping part, the overlapping part is received in the accommodating cavity; a knob shaft, penetrating the front housing from a side of the front housing away from the accommodating cavity to the accommodating cavity, wherein the knob shaft is capable of rotating;

an adjustment gear sleeved on a part of the knob shaft in the accommodating cavity, and configured to rotate with the rotating of the knob shaft;

an elastic member arranged in the accommodating cavity, wherein an end of the elastic member is connected on the rear housing; and a locking member arranged in the accommodating cavity and connected to another end of the elastic member;

wherein in response to the knob shaft moving towards the overlapping part, the adjustment gear is configured to be driven by the knob shaft to move to the overlapping part and mesh with the two telescopic arms, to drive the two telescopic arms to move towards or away from each other; and in response to the knob shaft moving away from the overlapping part, the adjustment gear is driven by the knob shaft to move away from the overlapping part, and the elastic member is configured to drive the locking member to bounce into the overlapping part to lock a relative position of the two telescopic arms.

19. The head mount display support of claim 18, wherein each of the two telescopic arms defines a guiding groove in the overlapping part; the adjustment gear is received in the guiding grooves in response to the adjustment gear moving to the overlapping part, and the adjustment gear meshes with an inner wall of each guiding grooves; and the two telescopic arms move towards or away from each other in response to the adjustment gear rotating along the guiding grooves.

20. The head mount display support of claim 18, wherein the two telescopic arms are relatively interleaving arranged, a side of one of the two telescopic arms facing the other one of the two telescopic arms, and a side of the other one of the two telescopic arms facing the one of the two telescopic arms, are configured to mesh with the adjustment gear.

* * * * *